(12) United States Patent
Andreasen et al.

(10) Patent No.: US 6,968,733 B2
(45) Date of Patent: Nov. 29, 2005

(54) DIGITAL COMPRESSION GAUGE

(75) Inventors: Keith Andreasen, Huntington Beach, CA (US); Phuong Pham, Westminster, CA (US)

(73) Assignee: Innova Electronics Corporation, Fountain Valley, CA (US)

( * ) Notice: Subject to any disclaimer, the term of this patent is extended or adjusted under 35 U.S.C. 154(b) by 66 days.

(21) Appl. No.: 10/755,497

(22) Filed: Jan. 12, 2004

(65) Prior Publication Data

US 2005/0150282 A1 Jul. 14, 2005

(51) Int. Cl.[7] .......................... G01N 25/56; G01N 5/02
(52) U.S. Cl. .................................................. 73/119 R
(58) Field of Search .............................. 73/119 R, 116, 73/117.2, 119 A, 115, 47; 702/138; 123/45 A

(56) References Cited

U.S. PATENT DOCUMENTS

| 3,765,233 | A | * | 10/1973 | Germann | 73/117.2 |
| 3,979,960 | A | * | 9/1976 | Schwartz | 73/744 |
| 4,050,296 | A | * | 9/1977 | Benedict | 73/116 |
| 4,562,728 | A | * | 1/1986 | Timmerman | 73/116 |
| 4,633,707 | A | * | 1/1987 | Haddox | 73/47 |
| 6,484,694 | B2 | * | 11/2002 | Thomas | 123/435 |

OTHER PUBLICATIONS

Equus Products, Inc. Catalog, p. 11 (1998).
Equus Products, Inc Catalog, Automotive Tester, Gauges and Tachometers and Cruise Control, p. 7 (1995).
Sunpro Catalog by Actron, Sunpro Solutions, p. 8 (Nov. 1996).
Pentron Products, Inc. Catalog, p. 7 (1988).

* cited by examiner

Primary Examiner—Eric S. McCall
Assistant Examiner—Octavia Davis
(74) Attorney, Agent, or Firm—Stetina Brunda Garred & Brucker

(57) ABSTRACT

There is provided a compression gauge assembly for diagnosing pressure variances of an engine cylinder(s). The gauge assembly comprises a gauge sensor in communication with the engine cylinder(s). The gauge sensor is operative to detect compression stroke pressures within the cylinder(s). A gauge controller is in communication with the gauge sensor. The gauge controller includes a comparator circuit operative to compare detected compression stroke pressures within the cylinder(s) and to derive the pressure variances therebetween. A gauge display is in communication with the gauge controller for displaying the derived pressure variances.

27 Claims, 4 Drawing Sheets

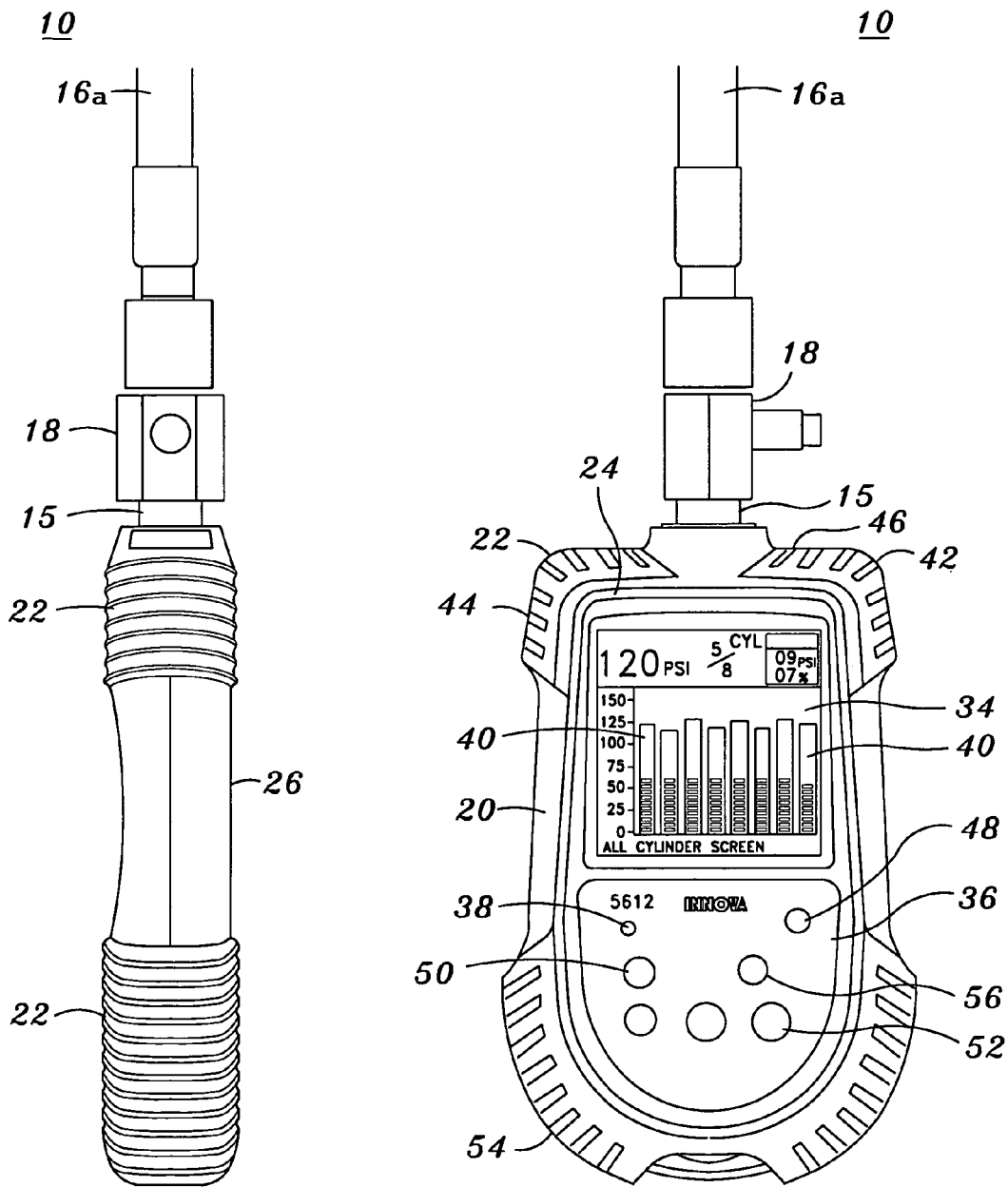

DIGITAL COMPRESSION GAUGE

CROSS-REFERENCE TO RELATED APPLICATIONS (Not Applicable)

STATEMENT RE: FEDERALLY SPONSERED RESEARCH/DEVELOPMENT (Not Applicable)

BACKGROUND OF THE INVENTION

The present invention relates generally to compression gauges, and more particularly to an improved digital compression gauge adapted to evaluate both cylinder pressures and pressure variances through diagnosing a plurality of compression stroke pressures from each of the engine cylinders.

Digital compression gauges are used to evaluate pressures in cylinders of an internal combustion engine. These compression gauges are usually connected to one engine cylinder at a time to perform a pressure diagnostic of that cylinder. More specifically, a conventional compression gauge typically measures only the pressure generated during the last compressing stroke of the piston within the connected cylinder. By measuring the last compressing stroke pressure, the digital compression gauge estimates the overall pressure generated within the connected engine cylinder, hence completing that cylinder's diagnostic.

Although conventional digital compression gauges provide suitable estimates of cylinder pressures, they do not typically function to provide accurate measurements of cylinder pressures based upon a multitude of compressing stroke pressures. In other words, rather than basing the overall cylinder pressure measurement of one stroke pressure, it is desirable to measure multiple stroke pressures and use that information for engine diagnostic purposes. Multiple samplings of stroke pressures can enhance the cylinder diagnostics as it is unsound to assume that the initial compressing stroke of the pistons will produce the identical amounts of pressure as the last compressing stroke.

Further deficiencies of the conventional digital compression gauges lie in their inability to notify variances between the pistons' different compressing strokes, as such differences may reflect certain pressure conditions that may be adverse to engine operation. Such deficiencies arise as a result of the limited functionality of conventional gauges which only measure the very last compressing strokes of the pistons to perform cylinder diagnostics. Consequently, there is a need to improve existing compression gauges to facilitate functioning beyond their traditional role of merely estimating the overall cylinder pressures or measuring only the final compressions stroke.

Thus, there has long been a need in the automobile industry for a digital compression gauge that can provide better measurements of cylinder pressures through evaluating a multitude samples of compressing stroke pressures rather than merely estimating the same based upon one compressing stroke pressure. Moreover, there exists a need for a digital compression gauge which can also determine variances between compressing stroke pressures so as to further facilitate engine diagnostics.

The present invention addresses and overcomes the above-mentioned deficiencies of conventional digital compression gauges by providing an improved digital compression gauge which is adapted to evaluate cylinder pressures through measuring, storing and processing a plurality of compression stroke pressures from each of the engine cylinders. The improved digital compression gauge of the present invention is therefore functional to determine compression variants, e.g., pressure variances between the initial and last compressing stroke pressures from each of the engine cylinders, and can display such variances simultaneously on a single visual display. In this respect, not only does the present invention eliminate the need to resort to merely estimating the cylinder pressures, but it additionally provides an extra beneficial function of providing the above-described pressure variances which extends far beyond the traditional operational role of conventional compression gauges.

BRIEF SUMMARY OF THE INVENTION

In accordance with the present invention, there is provided a compression gauge assembly for diagnosing pressure variances of an engine cylinder(s). The gauge assembly comprises a gauge sensor in communication with the engine cylinder(s). The gauge sensor is operative to detect compression stroke pressures within the cylinder(s). A gauge controller is in communication with the gauge sensor. The gauge controller includes a comparator circuit operative to compare detected compression stroke pressures within the cylinder(s) and to derive the pressure variances therebetween. A gauge display is in communication with the gauge controller for displaying the derived pressure variances.

In the present invention, the gauge controller comprises a detected pressure storage circuit for storing at least five compression stroke pressures. Further, the comparator circuit is operative to compare first and last compression stroke pressures detected in a cylinder, and for deriving the pressure variances therebetween. The gauge display is operative to generate a comparison of the first and last compression stroke pressures. Preferably, the gauge display represents the compression stroke pressures as bar graphs.

In accordance with the present invention, the compression gauge assembly further comprises a cylinder connector for communicating the compression stroke pressures from cylinders recessed in the engine. More specifically, the cylinder connector has a first connector end in communication with the gauge assembly and a second connector end extendable to engage the recessed cylinders. In the preferred embodiment, the cylinder connector includes a substantially rigid tube.

In the present invention, the gauge sensor comprises a plurality of sensors each in communication with the gauge controller and a dedicated cylinder. In the alternative, the gauge sensor comprises a sensor alternately connectable to a plurality of cylinders. Moreover, the detected pressure storage circuit is operative to store detected pressure level(s) in each cylinder. Also, the comparator circuit is operative to compare pressure levels in different cylinders.

In the present invention, the gauge controller is further operative to derive cylinder pressures by comparing at least one detected compression stroke pressure within the cylinder(s) with a reference compression stroke pressure and to derive the cylinder pressures based thereon. More particularly, the comparator circuit is operative to compare a last compression stroke pressure detected in a cylinder with the reference compression stroke pressure, and for deriving the cylinder pressures therebetween. Preferably, the reference compression stroke pressure is a maximum compression stroke pressure allowed by the cylinders.

BRIEF DESCRIPTION OF THE DRAWINGS

These as well as other features of the present invention will become more apparent upon reference to the drawings wherein:

FIG. 1 is a front view of a digital compression gauge constructed in accordance with a preferred embodiment of the present invention and illustrating its gauge display which is adapted to display both cylinder pressure and pressure variance from each cylinder of an engine;

FIG. 2 is a side view of the digital compression gauge shown in FIG. 1 and illustrating a number of protective covers shielding the corner portions of its gauge housing;

DETAILED DESCRIPTION OF THE INVENTION

Figure 3:
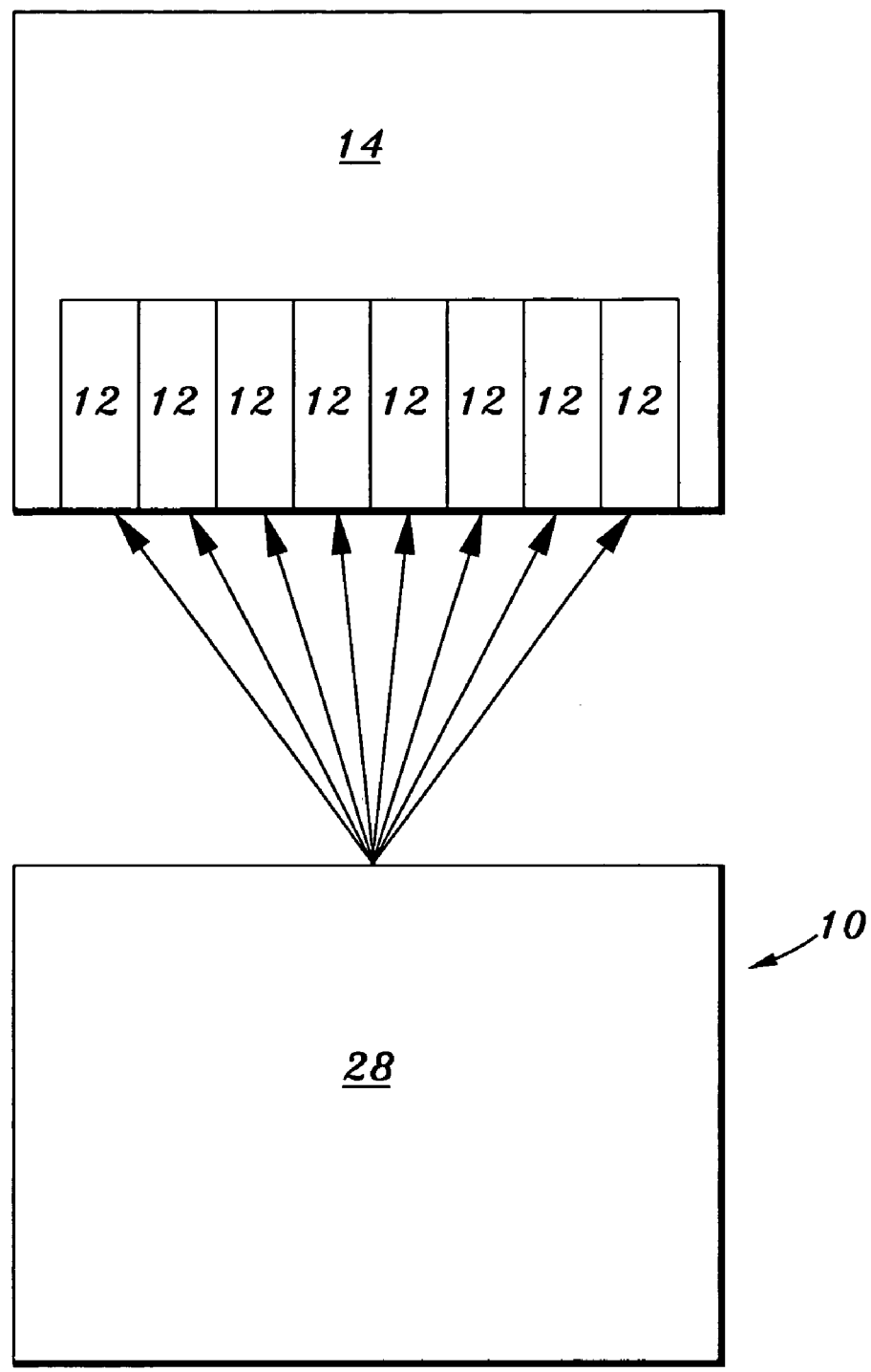
FIG. 3 is a block diagram of the digital compression gauge shown in FIG. 1 and illustrating its connection to any one of the multiple cylinders of the engine.

Referring now to the drawings wherein the showings are for purposes of illustrating preferred embodiments of the present invention only, and not for purposes of limiting the same, FIG. 1 illustrates a compression gauge 10 constructed in accordance with a preferred embodiment of the present invention. Although various types of compression gauges may be contemplated, the compression gauge 10 of the present invention is preferably digital. The compression gauge 10 is adapted to be connected to any one of the cylinders 12 of an engine 14 such as an internal combustion engine via a cylinder connector 16 such as a flexible connection hose 16a. More specifically, the present compression gauge 10 includes a gauge input port 15 which may be connected to a first connector end 17 of the connection hose 16a through the use of a fitting adaptor 18. The second end 19 of such hose 16a can then be engaged within the selected cylinder 12 of the engine 14 so that pressure diagnostics may be performed for that cylinder 12. It should be expressly stated herein that the application of the present compression gauge 10 is in no way limited to the engines of automobiles but may extend to engines of various other vehicles and/or machines such as aircrafts, ships, generators and the like.

Figure 5:
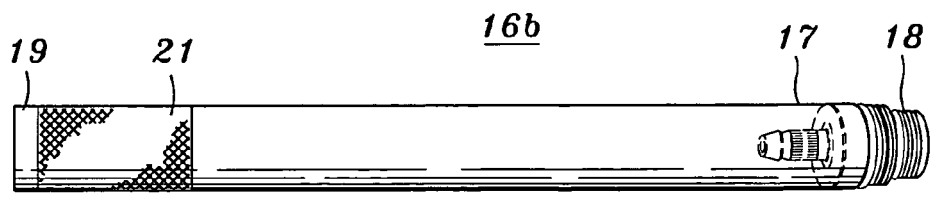
FIG. 5 is a side view of one type of a connector that may be utilized for connecting the digital compression gauge shown in FIG. 1 with any one of the multiple cylinders of the engine.

Referring briefly to FIG. 5, a different or alternative type of connector 16 may be utilized for connecting the present compression gauge 10 to any one of the cylinders 12 of the engine 14. In lieu of using a flexible connection hose 16a, a connection shaft 16b may be employed for use with the compression gauge 10 of the present invention. The connection shaft 16b is substantially rigid and includes a knurled shaft portion 21 which allows the connection shaft 16b to be better grabbed or grasped by the user. The first connector end 17 of this alternative shaft 16b may be connected to the gauge input port 15 through the use of a fitting adaptor 18. Its second connector end 19 is preferably threaded so that it may be threaded or screwed into the cylinders 12 of the engine 14. Such rigid connector 16b is optimal with certain engine types such as overhead camshaft engines which typically comprise aluminum cylinder heads and recessed spark plugs. The rigid, knurled shaft 16b allows the compression gauge 10 to be quickly, safely and easily installed on such engine types while eliminating the possibility for stripping the aluminum threads used on their cylinder heads. This is unlike the conventional flexible connection hose 16a which tends to flex in a manner that does not allow its connection to easily thread into the spark plug holes. This may undesirably result in thread stripping which often leads to the cylinder head being removed completely in order to repair the spark plug threads, hence resulting in additional labor time and cost.

Referring more particularly to FIGS. 1–3, the compression gauge 10 includes a gauge housing 20. The gauge housing 20 may be fabricated from any rigid material which can provide an effective protective shelling for various electrical and/or mechanical components disposed therewithin. One type of material which is optimal for fabricating the gauge housing 20 is plastic. It should be noted that the gauge input port 15 is formed through the gauge housing 20.

A number of protective covers 22 may be optionally provided around the gauge housing 20. The protective covers 22 may be located anywhere around the gauge housing 20. For instance, the protective covers 22 may be placed about the corner portions of the gauge housing 20. Such covers 22 provide a better protection against inadvertent droppings of the gauge 10 and/or other types of environmental impacts. The protective covers 22 may further offer gripping surfaces for allowing the gauge housing 20 to be better handle by the users. The protective covers 22 may be made from various materials such as plastic or rubber.

The gauge housing 20 has a front housing surface 24 and a rear housing surface 26. A gauge controller 28 (i.e., microcontroller) is disposed within the gauge housing 20 between its housing surfaces 24, 26. As will be explained below, the gauge controller 28 is configured to receive a plurality of compression stroke pressures from each of the cylinders 12 of the engine 14 so that it may derive or calculate their pressure variances and cylinder pressures.

Figure 4:
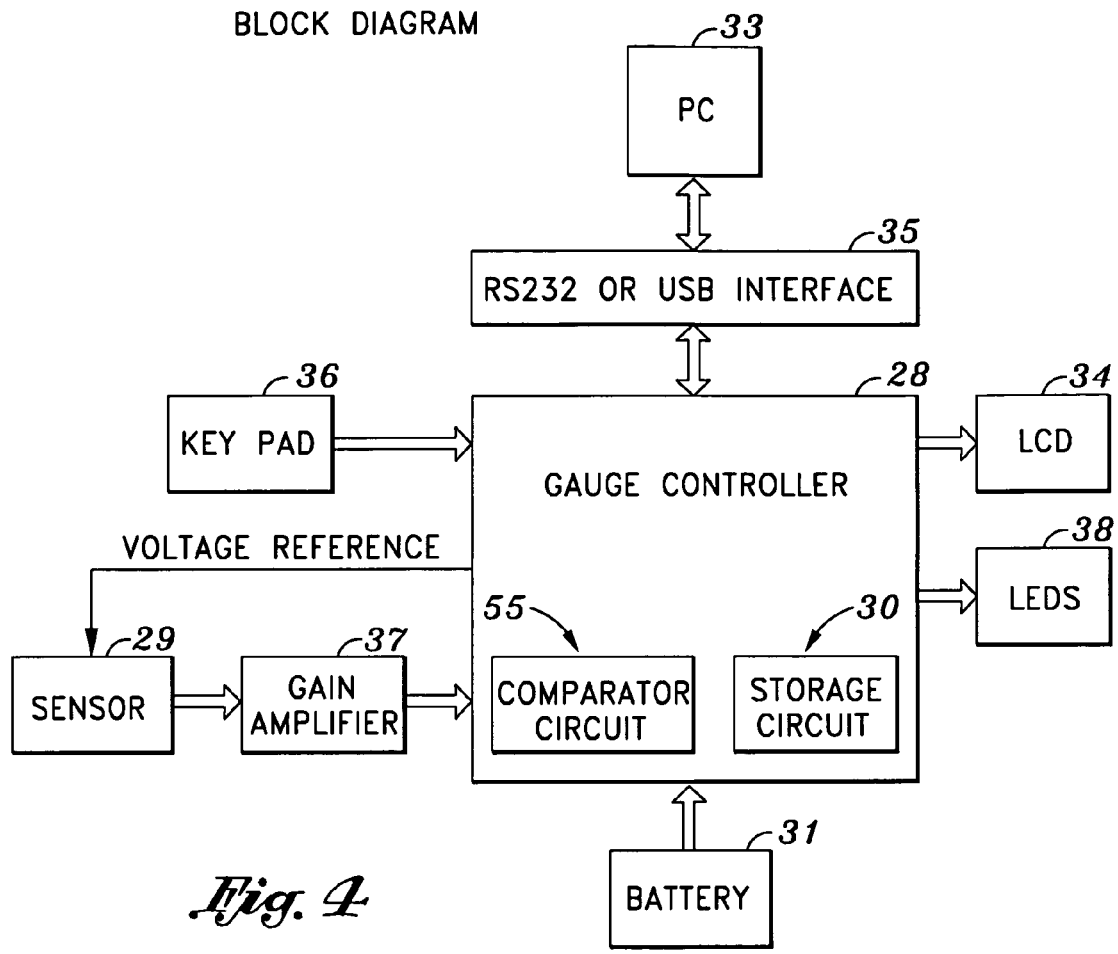
FIG. 4 is a block diagram of the digital compression gauge shown in FIG. 1 and illustrating the electrical communication between its gauge controller and various other components thereof.

Referring now to FIG. 4, the gauge controller 28 may be placed in electrical communication with a gauge sensor 29 in order to receive the compression stroke pressure that it needs to derive the pressure variances and cylinder pressures. More specifically, the gauge sensor 29 is electrically communicated to the gauge input port 15. By establishing such connection, the gauge sensor 29 may detect the compression stroke pressures from each of the cylinders 12 of the engine 14. In the preferred embodiment, the gauge sensor 29 may comprise a plurality of sensors each in communication with the gauge controller 28 and a dedicated cylinder 12. Or alternately, it may comprise a single sensor which is adapted to be alternately connectable to a plurality of cylinders 12.

The gauge controller 28 may include a comparator circuit 55 which may then utilize the compression stroke pressures detected by the gauge sensor 29 to achieve its goal of deriving or calculating the pressure variances and cylinder pressures of the cylinders 12. The signals representing the compression stroke pressures may be amplified by a gauge amplifier 37 before being transmitted to the gauge controller 28.

As further shown in FIG. 4, the gauge controller 28 may be placed in electrical communication with a detected pressure storage circuit 30. The pressure storage circuit 30 is essentially a memory module circuit such as a SRAM, for example, which may store the compression stroke pressures in memory. Preferably, five compression stroke pressures are stored in the pressure storage circuit 30. Such circuit 30 may also be utilized to store the finally derived pressure variances and cylinder pressures of the engine cylinders 12 in memory. As will be better explained below, the pressure storage circuit 30 may also be utilized to store preset reference compression stroke pressures of various types and/or models of engines 14 for obtaining pressures of cylinders. Various conventional memory module circuits which are currently available in the marketplace may be utilized for this purpose. Furthermore, a pressure transducer circuit may optionally be incorporated into the present compression gauge 10 to facilitate pressure differentiations of the received compression stroke pressures, if needed. Similar to the memory module circuit 30, various conventional pressure transducer circuits that are currently available in the marketplace may be used for such purpose.

Moreover, the compression gauge 10 of the present invention may be battery-operated through the use of one or more batteries 31. However, it should be specifically noted herein that the present compression gauge 10 is not necessarily limited to battery power, but may also obtain its operational power from a separate power source via the use of a power cord, for example. In addition, the operational capabilities of the present compression gauge 10 may be extended to, or even expanded by, a computer 33 such as a personal computer through the use of an interface 35 (e.g., RS232 or USB interface).

Referring now back to FIGS. 1 and 2, a gauge display 34 is disposed about the front housing surface 24. Preferably, the gauge display 34 is a digital display. Further preferably, the gauge display 34 is a liquid crystal display (LCD). The gauge display 34 is placed in electrical communication with the gauge controller 28. As will be also described below, such connection allows the gauge display 34 to display both cylinder pressures and pressure variances which are identified and calculated by the gauge controller 28. Moreover, a gauge control panel 36 or a keypad is further defined about the front housing surface 24 below the gauge display 34. As can be seen from FIG. 1, the gauge control panel 36 possesses a number of input buttons for selecting among various operations and modes of the present digital compression gauge 10. They will be discussed shortly below.

Referring now to specific visual indicators well defined in FIG. 1, the gauge control panel 36 has a plurality of status indicators 38. These indicators 38 are electrically connected to the gauge controller 28 so as to provide a type of visual indicia representative of the cylinder pressures identified and calculated thereby. More specifically, the status indicators 38 are preferably light emitting diodes (LEDs). Preferably, there are three LEDs, each of which are configured to selectively illuminate a different colored light (e.g., green, yellow and red) depending upon the cylinder pressures of the cylinders 12.

As further shown in FIG. 1, the gauge display 34 includes a plurality of stroke pressure indicators 40. Each of the stroke pressure indicators 40 are electrically connected to the gauge controller 28 and are associated with a respective one of the cylinders 12 in the engine 14. The pressure indicators 40 are operative to display the pressure variance of each of the cylinders 12 which, as will be explained in detail below, is derived by comparing the first and last compression stroke pressures in each cylinder 12. In the preferred embodiment, the stroke pressure indicators 40 are displayed as bar graphs on the gauge display 34. Each of the bar graphs are configured to selectively illuminate, wherein the illuminated or shaded portions of such graphs represent the first compression stroke pressures and the non-illuminated or non-shaded portions represent the last compression stroke pressures.

The gauge display 34 further includes a variance indicator 42 which is also electrically connected to the gauge controller 28. Essentially, the variance indicator 42 operates to display numerical figures or values which are representative of the pressure variances. Such variances in pressure may be displayed in pounds per square inch and/or in percentages. Furthermore, the gauge display 34 includes a pressure indicator 44 which is likewise electrically connected to the gauge controller 28. The pressure indicator 44 operates to display numerical figures or values that are representative of the cylinder pressures. Lastly, a cylinder indicator 46 is further shown on the gauge display 34. The cylinder indicator 46 is electrically connected to the gauge controller 28 and operates to indicate which cylinder 12 is currently being displayed by the variance and pressure indicators 42, 44.

Figure 6:
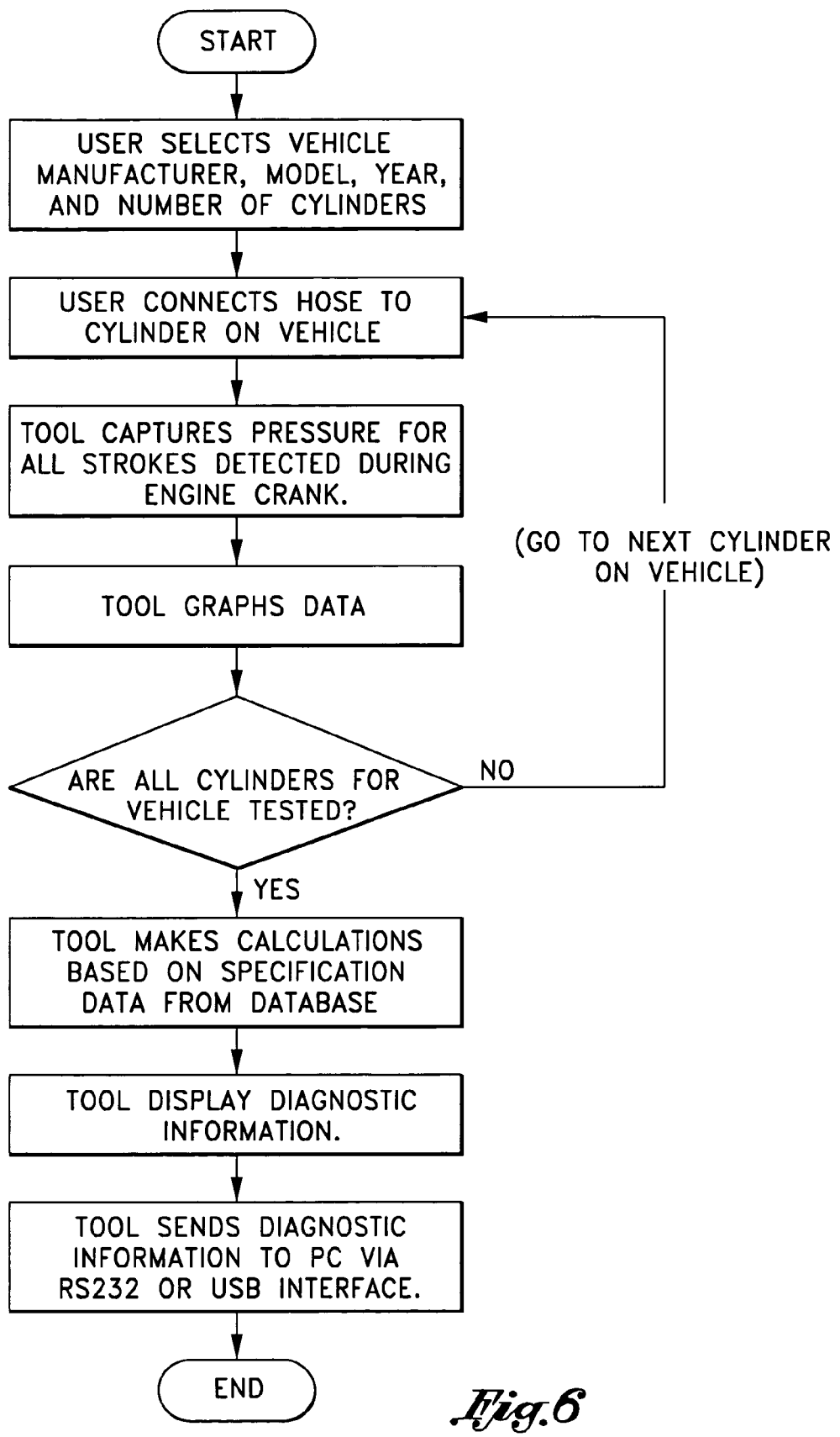
FIG. 6 is a flow diagram illustrating the basic process for diagnosing the pressure variances and the cylinder pressures of the engine cylinders with the digital compression gauge shown in FIG. 1.

With all the essential components of the present compression gauge 10 defined, its application upon the cylinders 12 of the engine 14 can now be clearly described, especially in view of FIG. 6 which sets forth the basic steps involved in utilizing the present compression gauge 10. The following application of the present compression gauge 10 facilitates in optimal engine diagnosis and confers certain benefits (e.g., enhancing volumetric and pumping efficiencies, deterring restrictions and/or obstructions in the exhaust intakes, etc.) to the engine 14 which can increase its performance and/or longevity. Various stages of the compression gauge's application will be illustrated in separate sections for ease of clarity.

Vehicle Preparation Stage:

First, the user of the present compression gauge 10 should run the engine 14 until the normal operating temperature of the engine 14 is reached. The engine 14 should then be shut off in order to disable its fuel and ignition system. All of the spark plugs should be removed. If necessary, the user may label the spark plug wires. The preparation stage can now be completed by ensuring that the throttle is secured in a wide-open position.

Set-Up Stage:

The user turns the compression gauge 10 on by activating its on/off button 48 which is positioned on the gauge control panel 36. Thereafter, a number of tool displays appears on the gauge display 34. Upon their appearance, the user can make a vehicle selection and further indicate whether the user wishes to revisit his or her previous diagnosed vehicle or start a new vehicle diagnosis. If the user wants to look at previous diagnostic data over again, he or she may choose that option by pressing on the mode button 50 which is placed on the gauge control panel 36.

However, if the new diagnostic test is desired, the user may select such option also through the use of the mode button 50. After making that selection, certain tool displays will appear on the gauge display 34 requesting the user to select the number of cylinders 12 (i.e., 1, 2, 3, 4, 5, 6, 8, 10 or 12 cylinders) in the new vehicle. The user can then input the applicable number of cylinders 12 via the mode button 50. Thereafter, the gauge display 34 would display all the above-mentioned indicators 38, 40, 42, 44, 46 so as to be ready to start the diagnostic procedure.

Diagnostic/Test Procedure Stage:

In order to commence with the diagnostic procedures, the user must first screw the second connector end 19 of the cylinder connector 16a or 16b into one of the cylinders 12. Thereafter, the compression gauge 10 of the present invention may be attached to the first connector end 17 of the cylinder connector 16a or 16b via the use of a special fitting adaptor 18. The user can then crank the engine 14 of the vehicle.

It should be noted that each diagnostic procedure should start and end with the same cylinder 12. In other words, it is highly recommended not to switch cylinders 12 in middle of one diagnostic procedure. The user should crank the engine 14 until there are a plurality of compression strokes on each cylinder 12. Preferably, there should be a minimum of five compression strokes on each cylinder 12.

Based upon the compression stroke pressures detected by the gauge sensor 29, the gauge controller 28 then calculates or derives the variance in compression pressure between the first and fifth strokes in the selected cylinder 12. As noted above, such pressure variance can be displayed on the gauge display 34 by the associated stroke pressure indicator 40 which is preferably a vertical bar graph. Simultaneously therewith, the gauge display 34 may further display psi per stroke and/or stroke number via the pressure indicator 44. It may also display the pressure variance between the first and last strokes in percentage and/or psi through the use of the variance indicator 42.

Furthermore, the status indicators 38 preferably in the form of three LEDs would selectively illuminate to indicate the current status of the cylinder pressure in the selected cylinder 12. More specifically, the first LED (i.e., green colored LED) illuminates if the associated cylinder pressure is well within the spec range, that is, the last compression stroke pressure (i.e., fifth stroke) is generally greater than fifty percent of the preset reference compression stroke pressure (i.e., maximum compression stroke pressure allowed by the selected cylinder 12). This indicates satisfactory cylinder pressure. In the alternative, the second LED (i.e., yellow colored LED) illuminates if the associated cylinder pressure is at marginal acceptable levels of the spec. Further alternatively, the third LED (i.e., red colored LED) illuminates if the associated cylinder pressure is out of the spec range, that is, the last compression stroke pressure is generally less than fifty percent of the reference compression stroke pressure of the selected cylinder 12. This would indicate non-optimal cylinder pressure condition. It should be noted herein that the reference compression stroke pressures of various types and/or models of the engines 14 may be stored in the memory circuit module 30 in order to carry out the above-described cylinder pressure diagnosis. Furthermore, such memory module 30 may also contain specific programming which can be utilized in order to implement the pressure variance and/or cylinder pressure diagnoses.

Thereafter, the user can scroll from the first stroke to the last stroke via the use of the right and left buttons 52, 54 located on the gauge control panel 36. This would change the gauge display 34 accordingly. Further, the user may clear the active stroke or cylinder data at any time by pressing the clear button 56 located on the gauge control panel 36. The user may also use the mode button 50 to save the stroke pressures. Optionally, the user may send the obtained diagnostic information to a computer 33 such as a personal computer via the use of an interface 35 (e.g., RS232 or USB interface).

In order to perform the complete diagnostic test on all the cylinders 12 of the engine 14, the user must repeat the diagnostic/test procedure stage for each of the cylinders 12. Simply put, that particular stage must be repeated until all the cylinders 12 of the engine 14 are completed.

Post Diagnostic/Test Procedure Stage:

When the cylinder pressure and pressure variance information of all the cylinders 12 are saved, the user may scroll back and forth through all the cylinders 12 and can select individual cylinders and switch back to stroke display by using the mode button 50. The user may return to the cylinder display by further using the mode button 50.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A compression gauge assembly for diagnosing pressure variances of an engine cylinder(s), the assembly comprising:
   a) a gauge sensor in communication with the engine cylinder(s), the gauge sensor being operative to detect compression stroke pressures within the cylinder(s);
   b) a gauge controller in communication with the gauge sensor, the gauge controller including a comparator circuit operative to compare detected compression stroke pressures within the cylinder(s) and to derive the pressure variances therebetween;
   c) a gauge display in communication with the gauge controller for displaying the derived pressure variances; and
   d) a cylinder connector for communicating the compression stroke pressures from cylinders recessed in the engine, the cylinder connector having a first connector end in communication with the gauge assembly and a second connector end extendable to engage the recessed cylinders.

2. The assembly of claim 1 wherein the gauge controller comprises a detected pressure storage circuit for storing at least five compression stroke pressures.

3. The assembly of claim 1 wherein the comparator circuit is operative to compare first and last compression stroke pressures detected in a cylinder, and for deriving the pressure variances therebetween.

4. The assembly of claim 3 wherein the gauge display is operative to generate a comparison of the first and last compression stroke pressures.

5. The assembly of claim 4 wherein the gauge display represents the compression stroke pressures as bar graphs.

6. The assembly of claim 1 wherein the cylinder connector includes a substantially rigid tube.

7. The assembly of claim 1 wherein the gauge sensor comprises a plurality of sensors each in communication with the gauge controller and a dedicated cylinder.

8. The assembly of claim 1 wherein the gauge sensor comprises a sensor alternately connectable to a plurality of cylinders.

9. The assembly of claim 1 wherein the gauge controller comprises a detected pressure storage circuit operative to store detected pressure level(s) in each cylinder.

10. The assembly of claim 1 wherein the comparator circuit is operative to compare pressure levels in different cylinders.

11. The assembly of claim 5 wherein the gauge display is operative to simultaneously display the compression stroke pressures of a plurality of cylinders.

12. A compression gauge assembly for diagnosing cylinder pressures of an engine cylinder(s), the assembly comprising:
   a) a gauge sensor in communication with the engine cylinder(s), the gauge sensor being operative to detect compression stroke pressures within the cylinder(s);
   b) a gauge controller in communication with the gauge sensor, the gauge controller including a comparator circuit operative to compare at least one detected compression stroke pressure within the cylinder(s) with a reference compression stroke pressure and to derive the cylinder pressures based thereon;
   c) a gauge display in communication with the gauge controller for displaying the derived cylinder pressures; and
   d) a cylinder connector for communicating the compression stroke pressures from cylinders recessed in the engine, the cylinder connector having a first connector end in communication with the gauge assembly and a second connector end extendable to engage the recessed cylinders.

13. The assembly of claim 12 wherein the gauge controller comprises a detected pressure storage circuit for storing at least five compression stroke pressures.

14. The assembly of claim 12 wherein the comparator circuit is operative to compare a last compression stroke pressure detected in a cylinder with the reference compression stroke pressure, and for deriving the cylinder pressures therebetween.

15. The assembly of claim 12 wherein the reference compression stroke pressure is a maximum compression stroke pressure allowed by the cylinders.

16. The assembly of claim 12 wherein the cylinder connector includes a substantially rigid tube.

17. The assembly of claim 12 wherein the gauge sensor comprises a plurality of sensors each in communication with the gauge controller and a dedicated cylinder.

18. The assembly of claim 12 wherein the gauge sensor comprises a sensor alternately connectable to a plurality of cylinders.

19. The assembly of claim 12 wherein the gauge controller comprises a detected pressure storage circuit operative to store detected pressure level(s) in each cylinder.

20. The assembly of claim 12 wherein the comparator circuit is operative to compare pressure levels in different cylinders.

21. The assembly of claim 14 wherein the gauge display is operative to generate a comparison of the last compression stroke pressure and the reference compression stroke pressure.

22. The assembly of claim 21 wherein the gauge display represents the compression stroke pressures as bar graphs.

23. The assembly of claim 22 wherein the gauge display is operative to simultaneously display the compression stroke pressures of a plurality of cylinders.

24. A method of diagnosing an engine cylinder(s) with a compression gauge assembly, the compression gauge assembly having a gauge sensor, a gauge display, a cylinder connector and a gauge controller with a comparator circuit, the method comprising the steps of:
   a) communicating compression stroke pressures from within the engine cylinder(s) to the gauge assembly via the cylinder connector:
   b) detecting the communicated compression stroke pressures within the engine cylinder(s) with the gauge sensor;
   c) comparing the detected compression stroke pressures within the cylinder(s) with the comparator circuit of the gauge controller;
   d) deriving pressure variances between the detected compression stroke pressures with the comparator circuit; and
   e) displaying the derived pressure variances on the gauge display.

25. The method of claim 24 wherein step d) comprises comparing first and last compression stroke pressures detected in a cylinder with the comparator circuit to derive the pressure variances therebetween.

26. A method of diagnosing cylinders in an engine with a compression gauge assembly, the compression gauge having a gauge sensor, a gauge display, a cylinder connector and a gauge controller with a comparator circuit, the method comprising the steps of:
   a) communicating compression stroke pressures from within the engine cylinder(s) to the gauge assembly via the cylinder connector;
   b) detecting the communicated compression stroke pressures within the engine cylinder(s) with the gauge sensor;
   c) comparing at least one detected compression stroke pressure within the cylinder(s) against a reference compression stroke pressure with the comparator circuit of the gauge controller;
   d) deriving cylinder pressures based on the comparison between the detected compression stroke pressure and the reference compression stroke pressure with the comparator circuit; and
   e) displaying the cylinder pressures on the gauge display.

27. The method of claim 26 wherein step d) comprises comparing a last compression stroke pressure detected in a cylinder against the reference compression stroke pressure to derive the cylinder pressure.

* * * * *